March 30, 1965 V. POLLASCHEK 3,176,084
APPARATUS FOR FIXING AND ADJUSTING A TRANSDUCER
CO-ACTING WITH A GUIDED RECORD CARRIER
Filed Oct. 12, 1962 2 Sheets-Sheet 1

INVENTOR
VIKTOR POLLASCHEK
BY
AGENT

INVENTOR
VIKTOR POLLASCHEK
BY Frank R. Trifari
AGENT 3,176,084
Patented Mar. 30, 1965

3,176,084

APPARATUS FOR FIXING AND ADJUSTING A TRANSDUCER CO-ACTING WITH A GUIDED RECORD CARRIER

Viktor Pollaschek, Vienna, Austria, assignor to North American Philips Company, Inc., New York, N.Y., a corporation of Delaware Filed Oct. 12, 1962, Ser. No. 230,062
Claims priority, application Austria, Nov. 9, 1961, 8,435/61
5 Claims. (Cl. 179—100.2)

This invention relates to fixing and adjusting devices for transducers such as recording and/or reproducing magnetic heads.

In arrangements in which the record carrier during scanning engages only the surface of the head provided with a useful gap, but must run freely in directly proximity to the head, it is only necessary for the gap to be adjustable relative to the direction of movement of the record carrier. Displacement of the head at right angles to the plane of the record carrier is generally not required. Various arrangements of head supports which satisfy these requirements are known.

The problem is quite different, however, if the record carrier is led over a wall having an opening in which the head is located. In this case the useful gap must not only be in the correct position relative to the direction of movement of the record carrier, but must also be correctly situated relative to the wall surface guiding the record carrier; this is true whether the gap is required to be located just before or behind the guide plane, or exactly in the guide plane.

The correct position must be maintained regardless of whether the guiding wall surface is plane or curved (cylindrical or otherwise) or whether the record carrier is broader or narrower than the aperture in the guide wall.

Arrangements in which a comparatively broad, tape-shaped record carrier is guided around a cylindrical drum in the wall of which at given areas heads scanning the tape are fixedly arranged are employed, for example, in the magnetic recording and reproducing of video-signals and for storage of general information. A device of this nature is shown, for example, in United States Patent 3,123,272, March 3, 1964.

The invention provides a fixing and adjusting device for a recording and/or reproducing magnetic head arranged in an aperture of a wall over which the record carrier is led on the side where the useful gap appears (front side). The head is provided with a circular-cylindrical envelope and is axially guided in a bore (hereinafter called the guide bore) of the wall or part of the wall. For fixing and adjusting the head, a plate is provided which can bear with at least one of its plate surfaces (serving as a bearing surface) on thrust surfaces provided at the back of the wall at right angles to the axis of the bore for guiding the head; the plate has a cylindrical bore extending at right angles to the bearing surface and having the same diameter as that of the guide bore. A fixing means, which may be a screw bolt, is provided in the plate and extends from the side into the bore thereof for fixing the head introduced into the bores. In addition, adjusting means are provided for turning a head fixed in the respective bores; this adjusting means may take the form of screw bolts cooperating with supports provided on the wall and coacting with springs, if desired.

The plate may be pushed against the thrust surfaces by spring means which have one supporting surface provided on the wall; alternatively, supporting surfaces may be provided on the wall adjacent and parallel to the thrust surfaces, and the plate, likewise having parallel surfaces, may be pushed as a fit between them. Further advantageous details of the apparatus will be apparent from the following description.

The fixing and adjusting device according to the invention is extremely simple in structure and operation. A head may readily be changed and readjusted. A particular advantage is the feature that the position of the gap relative to the direction of movement of the record carrier may be adjusted at any time without affecting the existing adjustment of the gap relative to the plane of the guide surface.

In order that the invention may be readily carried into effect, it will now be described with reference to the drawing, in which like reference numerals denote the same elements and wherein.

Figure 1:
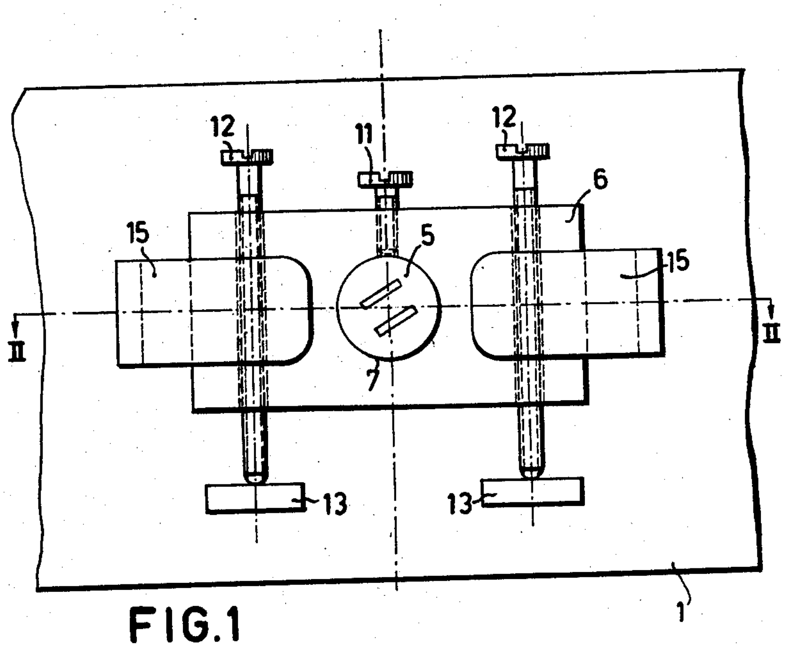
FIGURE 1 is an elevation view of one embodiment of a device according to the invention, as viewed from the back of the wall guiding the record carrier.

In all the figures the record carrier (not shown) is led over the surface 2 of a wall 1. The wall has a cylindrical bore 3 the axis 4 of which is at right angles to the surface 2 or, in case of a curved wall, at right angles to the tangential plane at the point of intersection of the axis and the surface of the wall. A scanning head 5 may be slipped as a close fit into the bore 3.

The head 5 is fixed and adjusted by means of a plate 6, which has a bore 7 of a diameter equal to that of the wall bore 3 and an axis 8 which is at right angles to the plate surface 9 adjacent the rear side of the wall 1 Thrust surfaces 10, located in a plane at right angles to the axis 4 of the bore 3, are provided on the rear side of the wall 1 as abutments for the plate surface 9. The head 5 introduced into the bore 7 of the plate may be fixed therein by means of a screw bolt 11. When the head 5 is inserted from behind through the bore 7 of the plate into the bore 3 of the wall with the useful gap in front and when the plate surface 9 is maintained in contact with the thrust surfaces 10, the desired spacing between the gap and the wall surface 2 may be adjusted and fixed by tightening to the bolt 11. The head 5 and the plate 6 may be turned together in the bore 3 of the wall. Two set screws 12 bearing on supports 13 are provided in the plate 6 for turning and fixing the plate 6 and hence the head 5. Due to the friction of the screws 12 on the supports 13, the screws 12 fundamentally also prevent the plate 6 and the head 5 from shifting in the direction of the axes 4 and 8, respectively. Instead of using two screws, a single screw with a counter spring is feasible.

It is preferable to provide means for maintaining the plate surface 9 in each case in contact with the thrust surfaces 10. This is ensured in the embodiment shown in FIGURES 1 and 2 by means of two springs 14 which bear on two supporting surfaces 15 provided on the wall.

Figure 2:
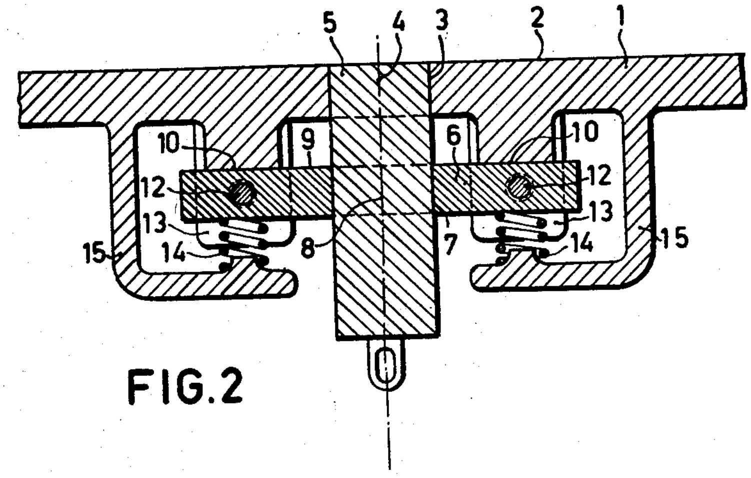
FIGURE 2 is a sectional view of FIGURE 1, taken along the line II—II.
Figure 3:
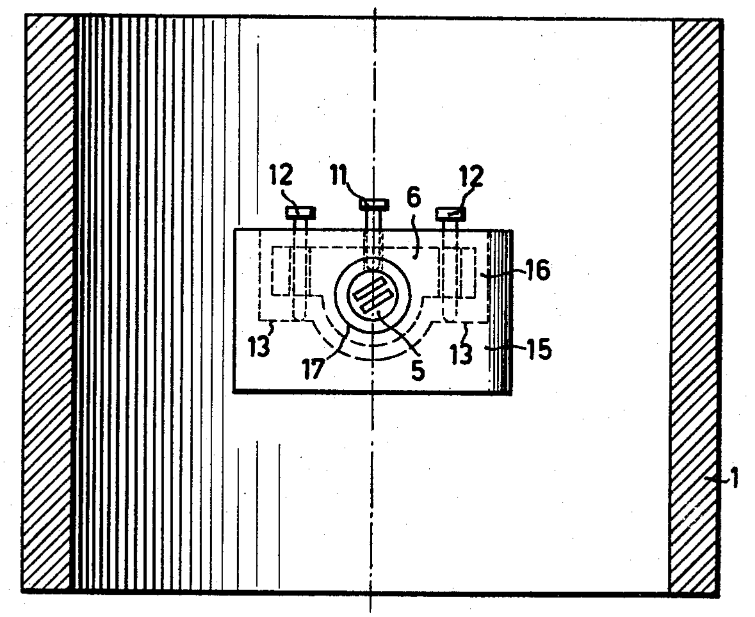
FIGURES 3 and 4 show another embodiment of the adjusting device according to the invention in elevational view and horizontal section respectively.
Figure 4:
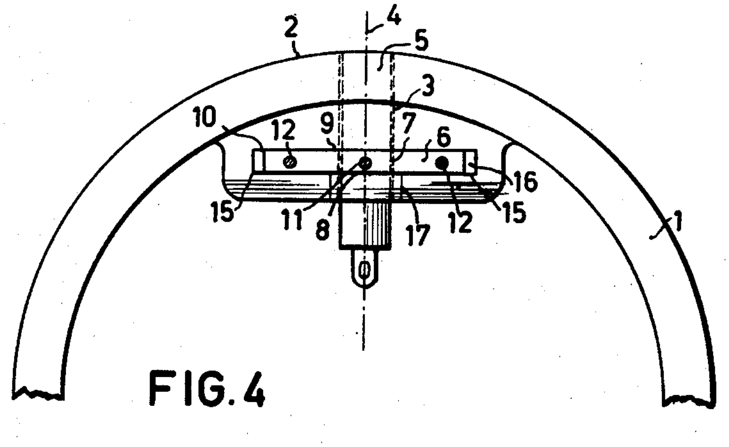

As shown in the embodiment of FIGURES 3 and 4, it is also possible in a very efficacious manner to provide a cavity 16, open on one side, at the back of the wall 1 behind the bore 3; the thrust surfaces 10, the supporting surfaces 15 and the supports 13 are located internally of the cavity 16. For introducing the head 5 into the plate 6 placed in the cavity 16, the rear wall of the cavity has an aperture 17. Instead of reserving space for accommodating the plate 6 within the cavity 16, as shown in FIGURE 4, it would also be possible to use a device with springs as shown in FIGURE 2.

In the device shown in FIGURE 4 the size of the aperture 17 is such that the head placed in the plate 6 does not contact the rear wall of the cavity 16. However, the aperture 17 may also be employed for axially guiding the head by giving the aperture 17 the same diameter as that of the bore 3 and forming the two bores 3 and 17 in one operation. In construction, the axial guide of the head 5 may also be provided by the bore 17 alone.

While the invention has been described with respect to specific embodiments, various changes and modifications thereof will be readily apparent to those skilled in the art without departing from the inventive concept, the scope of which is set forth in the appended claims.

What is claimed is:

1. An adjustable mount for a transducer arranged in an aperture of a wall across the surface of which a record carrier is adapted to be led to co-act with the front of the transducer containing the useful gap, comprising: a stationary wall having a nominal thickness and containing a cylindrical guide bore having an axis at substantially right angles to the wall surface, said wall having a thrust surface close to said guide bore extending back of the wall and beyond the nominal thickness thereof, a plate having a bearing surface, said plate containing a cylindrical plate bore having the same diameter as the guide bore and an axis at substantially right angles to the bearing surface, means for urging said bearing surface against said thrust surface, said bores being adapted to receive a transducer introduced therein, fixing means provided in said plate and extending into the plate bore for fixing the position of a transducer introduced therein with respect to the wall surface, and adjusting means co-acting with the plate and stationary supports for adjusting the position of the head relative to the direction of movement of the carrier by rotating the plate about said axes and fixing the plate in position.

2. An adjustable mount for a transducer arranged in an aperture of a wall across the surface of which a record carrier is adapted to be led to co-act with the front of the transducer containing the useful gap, comprising: a stationary wall having a nominal thickness and containing a cylindrical guide bore having an axis at substantially right angles to the wall surface, said wall having a thrust surface close to said guide bore extending back of the wall and beyond the nominal thickness thereof and a supporting surface also extending inside the wall and beyond the thrust surface, a plate having a bearing surface and a supporting surface, said plate containing a cylindrical plate bore having the same diameter as the guide bore and an axis at substantially right angles to the bearing surface, spring means arranged between the supporting surface of the wall and the plate for urging said bearing surface against said thrust surface, said bores being adapted to receive a transducer introduced therein, fixing means provided in said plate and extending into the plate bore for fixing the position of a transducer introduced therein with respect to the wall surface. and adjusting means co-acting with the plate and stationary supports for adjusting the position of the head relative to the direction of movement of the carrier by rotating the plate about said axes and fixing the plate in position.

3. An adjustable mount for a transducer arranged in an aperture of a wall across the surface of which a record carrier is adapted to be led to co-act with the front of the transducer containing the useful gap, comprising: a stationary wall having a nominal thickness and containing a cylindrical guide bore having an axis at substantially right angles to the wall surface, said wall having a thrust surface close to said guide bore extending back of the wall and beyond the nominal thickness thereof and a supporting surface also extending inside the wall parallel to and beyond the thrust surface, a plate having a bearing surface and a supporting surface, said plate containing a cylindrical plate bore having the same diameter as the guide bore and an axis at substantially right angles to the bearing surface, the plate being slipped as a fit between the thrust and supporting surfaces of the wall, said bores being adapted to receive a transducer introduced therein, fixing means provided in said plate and extending into the plate bore for fixing the position of a transducer introduced therein with respect to the wall surface, and adjusting means co-acting with the plate and stationary supports for adjusting the position of the head relative to the direction of movement of the carrier by rotating the plate about said axes and fixing the plate in position.

4. An adjustable mount for a transducer arranged in an aperture of a wall across the surface of which a record carrier is adapted to be led to co-act with the front of the transducer containing the useful gap, comprising: a stationary wall having a nominal thickness and containing a cylindrical guide bore having an axis at substantially right angles to the wall surface, said wall having a thrust surface close to said guide bore extending back of the wall and beyond the nominal thickness thereof, a plate having a bearing surface, said plate containing a cylindrical plate bore having the same diameter as the guide bore and an axis at substantially right angles to the bearing surface, means for urging said bearing surface against said thrust surface, said bores being adapted to receive a transducer introduced therein, said plate and thrust surface being contained in a cavity extending back of the wall which has an aperture in the rear wall thereof to allow passage of the head through the plate and the wall, fixing means provided in said plate and extending into the plate bore for fixing the position of a transducer introduced therein with respect to the wall surface, and adjusting means co-acting with the plate and stationary supports for adjusting the position of the head relative to the direction of movement of the carrier by rotating the plate about the axes and fixing the plate in position.

5. An adjustable mount for a transducer arranged in an aperture of a wall across the surface of which a record carrier is adapted to be led to co-act with the front of the transducer containing the useful gap, comprising: a stationary wall having a nominal thickness and containing a cylindrical guide bore having an axis at substantially right angles to the wall surface, said wall having a thrust surface close to said guide bore extending back of the wall and beyond the nominal thickness thereof and a supporting surface also extending inside the wall and beyond the thrust surface, a plate having a bearing surface and a supporting surface, said plate containing a cylindrical plate bore having the same diameter as the guide bore and an axis at substantially right angles to the bearing surface, spring means arranged between the supporting surface of the wall and the plate for urging said bearing surface against said thrust surface, said bores being adapted to receive a transducer introduced therein, said plate, thrust surface and supporting surfaces being contained in a cavity extending back of the wall which has an aperture in the rear wall thereof to allow passage of the head through the plate and the wall, fixing means provided in said plate and extending into the plate bore for fixing the position of a transducer introduced therein with respect to the wall surface, and adjusting means co-acting with the plate and stationary supports for adjusting the position of the head relative to the direction of movement of the carrier by rotating the plate about said axes and fixing the plate in position.

References Cited by the Examiner

UNITED STATES PATENTS

| | | | |
|---|---|---|---|
| 2,530,584 | 11/50 | Pontius | 179—100.2 |
| 2,943,860 | 7/60 | D'Arcy | 179—100.2 |
| 2,962,558 | 11/60 | Hoshino | 179—100.2 |

CLAUDE A. LE ROY, *Primary Examiner.*